United States Patent [19]

Ito et al.

[11] 4,048,613
[45] Sept. 13, 1977

[54] ALARM SYSTEM FOR EMERGENCY BRAKING

[75] Inventors: Hajime Ito; Teruo Yamanaka, both of Toyota; Osamu Ozeki, Nagoya, all of Japan

[73] Assignee: Toyota Jidosha Kogyo Kabushiki Kaisha, Japan

[21] Appl. No.: 551,719

[22] Filed: Feb. 21, 1975

[30] Foreign Application Priority Data

July 24, 1974 Japan .................................. 49-84149

[51] Int. Cl.$^2$ .............................................. G08G 1/00
[52] U.S. Cl. ............................... 340/53; 343/112 CA; 180/98
[58] Field of Search ................. 340/53, 32, 33, 52 R, 340/52 H; 180/98, 103 A; 343/112 CA, 7 ED

[56] References Cited

U.S. PATENT DOCUMENTS

| 2,699,834 | 1/1955 | O'Brien | 340/53 X |
| 2,996,137 | 8/1961 | Chu et al. | 340/53 X |
| 3,442,347 | 5/1969 | Hodgson et al. | 180/98 |
| 3,689,882 | 9/1972 | Dessailly | 340/53 |
| 3,778,826 | 12/1973 | Flannery et al. | 343/7 ED |
| 3,874,475 | 4/1975 | Permut et al. | 180/98 |
| 3,898,652 | 8/1975 | Rashid | 343/6 R |

Primary Examiner—John W. Caldwell
Assistant Examiner—Joseph E. Nowicki
Attorney, Agent, or Firm—Toren, McGeady and Stanger

[57] ABSTRACT

In a vehicle an alarm issues a warning signal just before actuation of an automatic emergency brake which operates in response to the relative speed and relative distance beween the vehicle and an obstacle in the vehicle's path.

6 Claims, 3 Drawing Figures

ALARM SYSTEM FOR EMERGENCY BRAKING

BACKGROUND OF THE INVENTION

This invention relates to a device for automatically applying the brakes of a vehicle when there is any probability of collision with an object, such as another vehicle, and more particularly to a device which automatically warns of an impending emergency braking operation a moment before the emergency brake is actually applied.

In one known vehicle safety arrangement a so-called radar brake system automatically brakes the vehicle after detecting an obstacle in the path of the moving vehicle with a radar and then determining the possibility of a collision from the relative speed and relative distance between the vehicle and the obstacle. Such a radar brake system, however, usually operates when the vehicle is running at high speed and causes high deceleration, so that unless the passenger is given advance warning of the impending braking action and allowed to take a suitable defensive stance, he may be thrown forward and bump his head against the windshield, driving panel or front seat. Also, the driver may become flustered and operate the steering wheel in a manner which invites even greater danger.

An object of the invention is to avoid these dangers.

Another object of the present invention is to give passengers advance warning of an impending automatic braking action before the brake action starts.

SUMMARY OF THE INVENTION

According to a feature of the present invention an obstacle detecting means detects the relative speed and relative distance between the vehicle and an obstacle in the path of said vehicle, deciding means respond to occurrence of an output signal from the obstacle detecting means and decide the distance $R_1$ in which the vehicle will collide with the object unless the vehicle is decelerated at a specified rate of deceleration, an emergency braking warning means operate upon receiving an output signal corresponding to the distance $R_2$ decided by said detecting means, and an emergency braking means operate in response to receiving an output signal corresponding to the distance $R_1$ decided by said deciding means.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the accompanying drawings.

DESCRIPTION OF PREFERRED EMBODIMENTS

Figure 1:
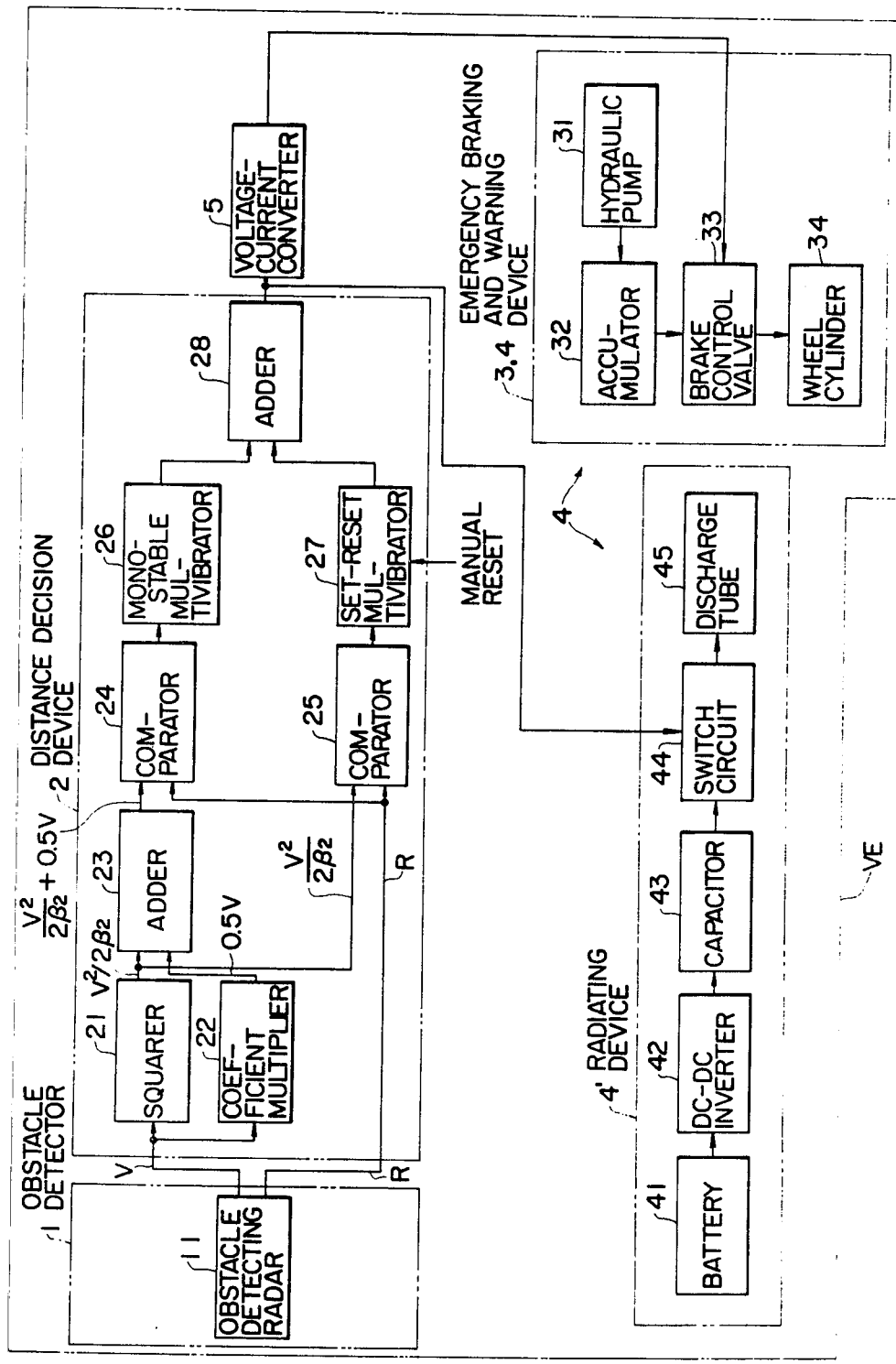
FIG. 1 is a block diagram of a vehicle emergency braking system embodying features of the present invention.

In the drawing, an obstacle detector 1 is installed in a vehicle VE which includes, in addition to the usual drive and chassis facilities, a distance decision device 2, an emergency braking device 3, and an emergency warning device 4. An obstacle detecting radar produces an analog voltage proportional to the relative speed and relative distance R between the vehicle and an obstacle in the vehicle path. The distance decision device 2 receives the output signals from the radar 11. Within the latter, the output signals corresponding to the relative speed V are applied to a squarer 21 and a coefficient multiplier 22. An adder 23 receives the output signals from the squarer 21 and the coefficient multiplier 22. The latter applies its output signal to a comparator 24.

The comparator 24 possesses a second input terminal at which it receives an output signal corresponding to the relative distance R measured by the obstacle detecting radar 11. Another comparator 25 compares the output signal corresponding to the distance R with the output signal from the squarer 21.

The output signal from the comparator 24 actuates a monostable multivibrator 26 while the output signal from the comparator 25 actuates a set-reset multivibrator 27. An adder 28 utilizes the respective signals from the monostable multivibrator 26 and set-reset multivibrator 27. The adder 28 forms the output of the distance decision device 2.

A voltage-current converter 5 converts the output of the adder 28, i.e. the output from the distance decision device 2, into an electric current and supplies it to the emergency braking device 3. This braking device also serves as an emergency braking alarm device or emergency warning device 4 and preferably includes a radiating device 4'. The latter emits light to warn passengers that automatic emergency braking measures are about to take place. The radiating device 4' receives its operating signal directly from the adder 28.

Within the emergency braking device 3, a hydraulic pump 31 actuates an accumulator 32. A brake control valve 33 which responds to the voltage-current converter 5 controls the output of the accumulator 33 and subsequently regulates the hydraulic pressure in wheel cylinders 34 for the respective wheels. The brake control valve 33 may be in the form of a pressure servo valve operated by the output current from the converter 5.

The radiating device 4' operates from a battery 41, such as the automobile battery. A DC-DC inverter 42 stores energy across a capacitor 43. The output voltage from the adder 28 of the distance decision device 2 controls the gate terminal of a switch circuit 44 which applies the charge accumulated across the capacitor 43 to flow into a discharge tube 45 to emit light.

In operation, the vehicle VE travels along a road and the radar 11 detects various obstacles that may be in its path. With each obstacle the radar 11 establishes a voltage corresponding to the distance R between the vehicle and the obstacle and establishes a voltage corresponding to the relative speed between the vehicle VE and the obstacle. The squarer 21 squares the voltage corresponding to V. The gain of the squarer is adjusted to produce an output voltage proportional to $V^2/2\beta_2$ where $\beta_2$ is a predetermined vehicle deceleration such as $0.6 \times 9.8$ m/sec$^2$. At the same time the coefficient multiplier 22 multiplies the voltage representing the value V by a predetermined value such as 0.5. The adder 23 then produces a voltage corresponding to $V^2/2\beta_2 + 0.5V$.

As the vehicle VE approaches the detected obstacle at the relative speed V, the value $V^2/2\beta_2$ at the squarer 22 represents the distance $R_1$ at which the vehicle VE will collide with the obstacle unless the vehicle is decelerated at $\beta_2$. The value $V^2/2\beta_2 + 0.5V$ at the output of adder 23 represents the distance $R_2$ between the vehicle VE and the obstacle just 0.5 seconds before the vehicle reaches the distance $R_1$. That is, as the vehicle VE approaches the obstacle it reaches the distance $R_2$ 0.5 seconds before it reaches the distance $R_1$. Thus the voltages of multiplier 22 and adder 23 establish two index distances $R_1$ and $R_2$ from the object based upon the detected relative speed V.

The comparator 24 compares the voltage representing the index distance $R_2 = V^2/2\beta_2 + 0.5V$ with the voltage representing the actual measured distance R and produces an output when the actual distance R is less than the index distance $R_2 = V^2/2\beta_2 + 0.5V$ further from the obstacle. That is the comparator 24 produces its signal when the vehicle VE is closer to the obstacle than $R_2$.

The comparator 25 compares the voltage corresponding to the index distance $R_1 = V^2/2\beta_2$ (which is closer to the obstacle) with the actual detected distance R. It produces an output when the vehicle is closer to the obstacle when the distance $R_1 = V^2/2\beta_2$. That is it produces a signal when $R < R_1 = V^2/2\beta_2$.

Needless to say, when a vehicle approaches an obstacle it will reach the distance $R_2$, which is further from the obstacle, before it reaches the distance $R_1$ which is closer to the obstacle. Thus, the distance R will become less than $R_2 = V^2/2\beta_2 + 0.5V$ before it becomes less than $R_1 = V^2/2\beta_2$. Thus the comparator 24 will produce its output signal before the comparator 25 produces its signal. Specifically, if the relative velocity V remains constant the output of the comparator 24 precedes the output of comparator 25 by 0.5 seconds.

An output from the comparator 25 indicates that the vehicle is closer to the obstacle than $R_1 = V^2/2\beta_2$, and that the emergency braking is to be applied. An output from the comparator 24 indicates that the distance $R_2$ remains between the vehicle and the obstacle.

Upon receiving the output signal from the comparator 24, the monostable multivibrator 26 produces a low voltage pulse for a time, less than 0.5 seconds, such as 0.12 seconds. When the comparator 25 produces its output signal in response to the vehicle reaching the distance $R_1$ from the obstacle, the multivibrator 27 produces a high voltage step which continues until the multivibrator is manually reset. The short 0.12 second pulse signal from the multivibrator 26 is arranged to end before the signal from the multivibrator 27 starts. The adder 28 adds the signals from the multivibrator 26 and 27. Since these two multivibrator signals are time separated, the output of the adder produces these signals, (or produces corresponding signals) sequentially.

Figure 2:
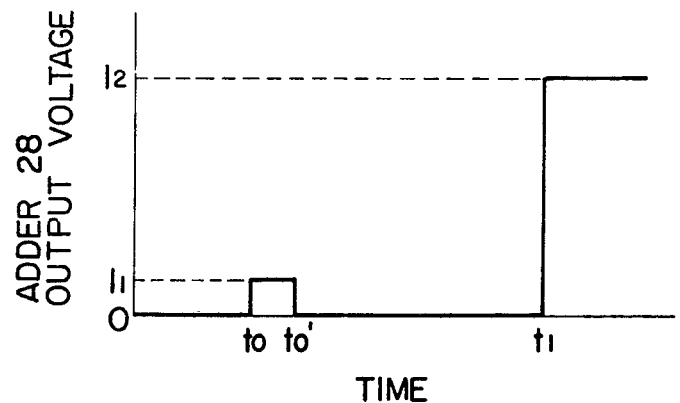
FIG. 2 is a graph showing the output voltage of the deciding means in the device of the present invention.

The output of the adder 28 is shown in FIG. 2. Here the pulse with the pulse height $V_1$ between the times $t_o$ and $t_o'$ represents the voltage output from the multivibrator 26. The step at time $t_1$ with the voltage $V_2$ represents the output of the multivibrator 27 which is reset manually.

Figure 3:
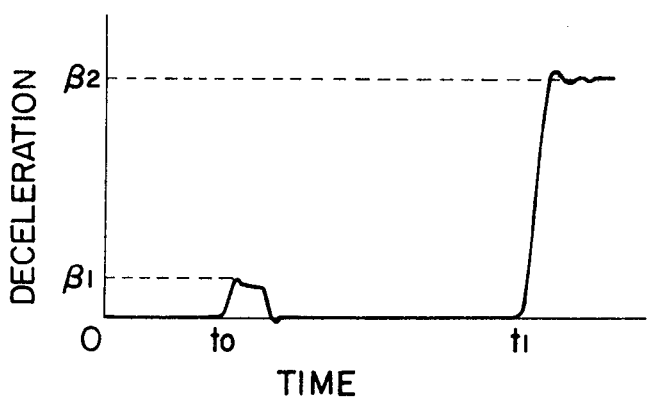
FIG. 3 is a graph showing the vehicle deceleration corresponding to the output voltage of the deciding means.

The voltage-current converter 5 converts the output voltage of the adder 28 to an electric current and supplies it to the emergency braking device 3. An ordinary pressure servo valve may be used as the brake control valve 33 for the emergency braking device 3 for obtaining a hydraulic pressure proportional to the input current. Thus, a pressure proportional to the output voltage as plotted in FIG. 2 is applied to the wheel cylinder 34 of each wheel. As a result the vehicle deceleration undergoes a change that varies with time as shown in FIG. 3.

As described above, according to the present invention, momentary braking action is exercised at low deceleration $\beta_1$ a moment (for instance 0.5 seconds) before the time $t_1$ at which the emergency braking device 3 is operated. This shakes the vehicle to warn the vehicle passengers of an impending application of the automatic emergency brake. Such preliminary braking suggests imminent application of automatic emergency braking to the passengers and allows them reflexively to assume a defensive posture against an actual emergency braking action to avoid any danger which would otherwise occur.

In addition to having the braking device 3 perform the emergency braking warning function or perform the function in combination with another mechanism, the radiating device 4' is provided. The output voltage of the adder 28 is applied to the gate terminal of the switch circuit 44 at the time $t_0$ in FIG. 2. This causes the electric charges accumulated in the capacitor 43 to flow into the discharge tube 45 to emit light momentarily. Such flashing of light can furnish a simultaneous alarm to all of the passengers. The light is made sufficiently intense so the passengers can sense it even when their eyes are closed. To prevent the passengers from being dazzled by the light, it is emitted only for a duration of several milliseconds and indirectly. It is to be noted that light is not emitted again at the time $t_1$ because it takes 5 to 10 seconds to recharge the capacitor 43 and also the time $(t_1 - t_0)$ is only about 0.5 seconds.

According to another embodiment of the invention, the light is operated instead of the short braking alarm. Thus, according to the system disclosed, the passengers are given prior warning of imminent automatic emergency braking by shaking of the vehicle body and/or emission of strong light a moment before actuation of the emergency braking device. Thus the passengers can take a defensive posture against actual emergency braking to avoid bumping against the front panel or the front seat. Also, the driver is warned to control himself and avoid dangerous misoperation of the steering wheel. In practice of the present invention, best results are obtained by setting the deceleration $\beta_1$ immediately before application of emergency brake at 0.08 to 0.12 g., the time $(t_1 - t_0)$ at 0.4 to 0.6 sec., and the time $(t_0' - t_0)$ at 0.10 to 0.12 sec.

While specific embodiments of the invention have been shown and described in detail to illustrate the application of the inventive principles, it will be understood that the invention may be embodied otherwise without departing from such principles.

What is claimed is:

1. For a vehicle emergency braking device which includes a speed and distance detecting device, and which automatically operates to perform an emergency braking action in response to one of a first set of relative speeds and relative distances between the vehicle and an object in the path of the vehicle and which remains inactive insofar as emergency braking is concerned in response to a second set of relative speeds and relative distances, an alarm system comprising: decision means responsive to the first and second sets of relative speeds for determining a first distance from the object at which an emergency braking action would occur, control means responsive to the first and second sets of relative speeds and coupled to the decision means for producing an output signal representing a second distance greater than the first distance, and signal means coupled to said control means and responsive to said detecting device for issuing an alarm signal for vehicle passengers in response to a distance signal from the detecting device being less than the second distance, said signal means ending the alarm signal prior to the emergency braking action and thereafter maintaining the alarm signal inactive will onset of an emergency braking action, the duration of the alarm signal being less than the time from the end of the signal until the onset of the emergency braking action.

2. The alarm system for emergency braking for vehicles according to claim 1, wherein said signal means comprises a means for momentarily braking and decelerating the vehicle and then allowing a momentary resumption of speed in response to a signal from the detecting device being less than the second distance in said control means before the emergency braking action.

3. The system for emergency braking for vehicles according to claim 1, wherein said signal means comprises a means which momentarily emits light in response to a signal from the detecting device being less than the second distance in said control means before the emergency braking action.

4. A vehicle emergency braking system, comprising obstacle detecting radar means for producing a speed signal proportional to the relative speed and a distance signal proportional to the relative distance between the vehicle and an obstacle, signal forming means coupled to said radar means for producing a first signal representing a first distance from the vehicle at which the vehicle will collide with the obstacle at the relative speed unless the vehicle is decelerated at a predetermined deceleration and a second signal representing a second distance between the vehicle and the obstacle a predetermined time before the vehicle reaches the first distance, first comparator means coupled to said radar means and said signal forming means for comparing the first signal with the distance signal from said radar means and producing a first comparator signal when the distance signal has a given relationship to the first signal, second comparator means coupled to said signal forming means and said radar means for comparing the second signal with the distance signal from said radar means and producing a second comparator signal when the distance signal and the second signal have a predetermined relationship to each other, and signal means coupled to said comparators for producing a humanly sensible alarm signal in the vehicle in response to the second comparator signal, and emergency braking means coupled to said comparators and responsive to the first comparator signal for producing emergency braking in the vehicle said signal means ending the alarm signal prior to the emergency braking and thereafter maintaining the alarm signal inactive until onset of the emergency braking, the duration of the alarm signal being less than the time from the end of the alarm signal until the onset of emergency braking.

5. A system as in claim 4, wherein said signal means for producing a humanly sensible signal includes means for momentarily braking the vehicle.

6. A system as in claim 4, wherein said signal means for producing a humanly sensible signal includes means for producing a visible flash.

* * * * *